United States Patent
Chae

(10) Patent No.: US 7,187,565 B2
(45) Date of Patent: Mar. 6, 2007

(54) HIGH VOLTAGE POWER SUPPLY

(75) Inventor: Young-min Chae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 10/986,776

(22) Filed: Nov. 15, 2004

(65) Prior Publication Data

US 2005/0259449 A1   Nov. 24, 2005

(30) Foreign Application Priority Data

May 20, 2004  (KR) ............... 10-2004-0036000

(51) Int. Cl.
*H02M 3/335* (2006.01)
(52) U.S. Cl. ................. 363/69; 363/16; 363/21.17
(58) Field of Classification Search .......... 363/69, 363/16, 21.18, 21.15, 20, 21.01, 21.16, 21.17
See application file for complete search history.

(56) References Cited

U.S. PATENT DOCUMENTS 5,534,768 A  * 7/1996 Chavannes et al. ......... 323/267

FOREIGN PATENT DOCUMENTS

| JP | 2000-341948 | 12/2000 |
|----|-------------|---------|
| JP | 2001-190071 | 7/2001  |
| JP | 2003-209972 | 7/2003  |
| KR | 1998-019725 | 6/1998  |

* cited by examiner

Primary Examiner—Shawn Riley
(74) Attorney, Agent, or Firm—Roylance, Abrams, Berdo & Goodman, LLP

(57) ABSTRACT

A high voltage power supply (HVPS) including an oscillation circuit for generating and outputting an alternating current (AC) voltage using an oscillation of a transformer, and a voltage multiplying circuit for increasing the AC voltage from the oscillation circuit using a plurality of voltage doublers, and outputting the increased AC voltage. The power supply further includes a controller for controlling the oscillation circuit.

19 Claims, 4 Drawing Sheets

HIGH VOLTAGE POWER SUPPLY

CROSS-REFERENCE TO RELATED APPLICATIONS

This application claims the benefit under 35 U.S.C. §119(a) of Korean Patent Application No. 2004-36000 filed in the Korean Intellectual Property Office on May 20, 2004, the entire contents of which are incorporated herein by reference.

BACKGROUND OF THE INVENTION

1. Field of the Invention

The present invention relates to a high voltage power supply. More particularly, the present invention relates to a high voltage power supply having a voltage multiplying circuit part, which is capable of generating a high voltage using a diode and a capacitor element having low rated voltage.

2. Description of the Related Art

Generally, a high voltage power supply (HVPS) is employed in devices such as a copier, laser printer, facsimile, and digital printer as a core part, which operates to instantly convert low voltage of 12–24V to high voltage of several hundreds volts (V), or to several thousand volts (kV) for use in temporarily inscribing images on a drum of the printer or copier.

A conventional high voltage power supply generally increases the number of turns of a secondary side of a voltage transformer to increase the output voltage value, and then outputs the high voltage to a developing unit (not shown) and any number of associated circuit elements. However, because the voltage increase at both ends of such an element, including a diode or capacitor, is in direct proportion to the increased number of turns of the secondary side of the voltage transformer, it becomes necessary to use an element of high electrical output rate. Unfortunately, the price of a capacitor or diode increases in proportion to the increase of the voltage rate, and therefore, the price of high voltage power supplies is usually high.

This is often the case in high-speed and high-quality laser printers or copiers, in which a power supply having elements of higher output voltage and current capacitance is required. Therefore, the price of the power supply increases, as does the price of the printers or copiers.

Accordingly, a need exists for a power supply which is capable of providing high output voltage with constant voltage current, while reducing the rated capacity of the elements, such as diode or capacitor elements within the supply.

SUMMARY OF THE INVENTION

The present invention has been made to overcome the above-mentioned and other problems. Accordingly, it is an object of the present invention to provide a high voltage power supply which is capable of providing high output voltage with constant voltage current, while reducing the rated capacity of the elements such as diode or capacitor elements.

The above-mentioned objects and/or other features of the present invention are substantially achieved by providing a high voltage power supply comprising an oscillation circuit for generating an alternating current (AC) voltage by using an oscillation of a transformer, and outputting the AC voltage. The power supply further comprises a voltage multiplying circuit for increasing the AC voltage from the oscillation circuit by using a plurality of voltage doublers, and outputting the increased AC voltage. A controller is provided for controlling the driving of the oscillation circuit.

Additionally, the high voltage power supply may further comprise a low pass filter in accordance with an embodiment of the present invention for receiving a pulse width modulation (PWM) signal, converting the received signal into a predetermined reference signal, and outputting the reference signal to the controller. The power supply may further comprise a sensing unit for detecting, in real time basis, the size of the voltage output from the voltage multiplying circuit, and for generating and outputting a voltage detect signal. The power supply may still further comprise a circuit protecting and rectifying unit for rectifying the voltage detect signal input from the sensing unit into a DC level and outputting the same.

The oscillation circuit transformer may comprise either a general transformer or a flyback transformer.

According to an object of the present invention, the controller compares the predetermined reference signal input from the low pass filter, with the voltage input as a feedback from the circuit protecting and rectifying unit. If the reference detect signal is smaller than the reference signal, the controller outputs a high level of voltage signal to drive the oscillation circuit.

The low pass filter of the power supply may comprise a plurality of resistors and a plurality of capacitors.

The sensing unit of the power supply may comprise at least one operating amplifier, a plurality of resistors, and a plurality of capacitors.

The circuit protecting and rectifying unit of the power supply may comprise at least one operating amplifier, a plurality of resistors, and a plurality of diodes.

BRIEF DESCRIPTION OF THE DRAWINGS

The above objects and features of the present invention will be more apparent by describing certain exemplary embodiments of the present invention with reference to the accompanying drawings, in which.

Throughout the drawings, like reference numerals will be understood to refer to like parts, components and structures.

DETAILED DESCRIPTION OF THE EXEMPLARY EMBODIMENTS

Figure 1:
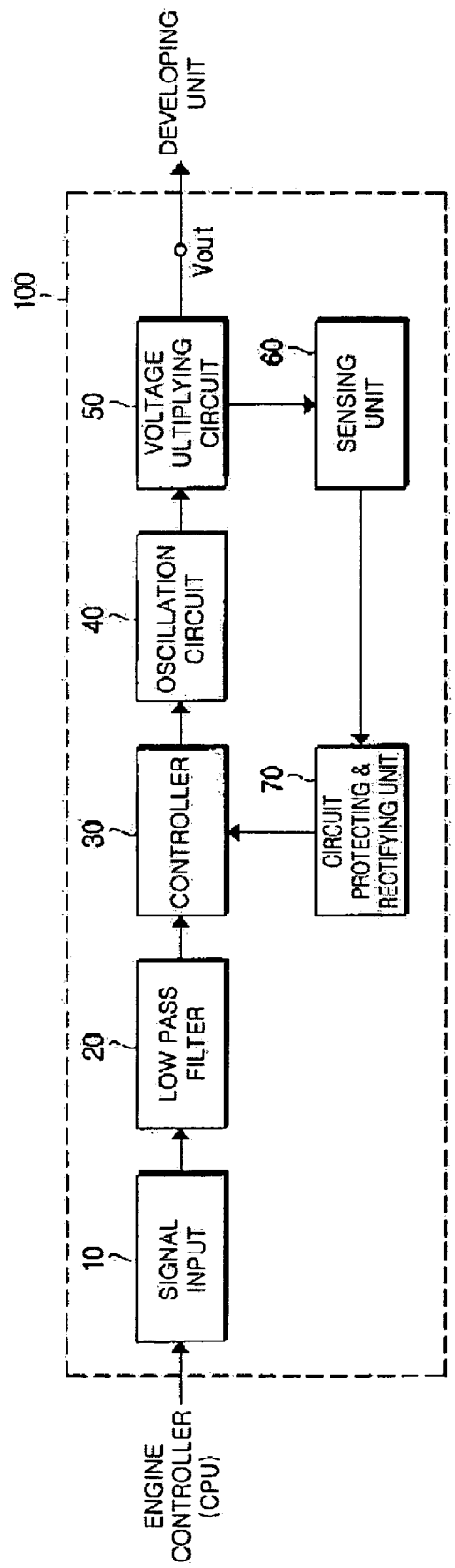
FIG. 1 is a block diagram of an example high voltage power supply according to an embodiment of the present invention.

Certain embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention. Functions or constructions which are known to those skilled in the art are not described in detail, since they would obscure the invention in unnecessary detail.

Figure 2:
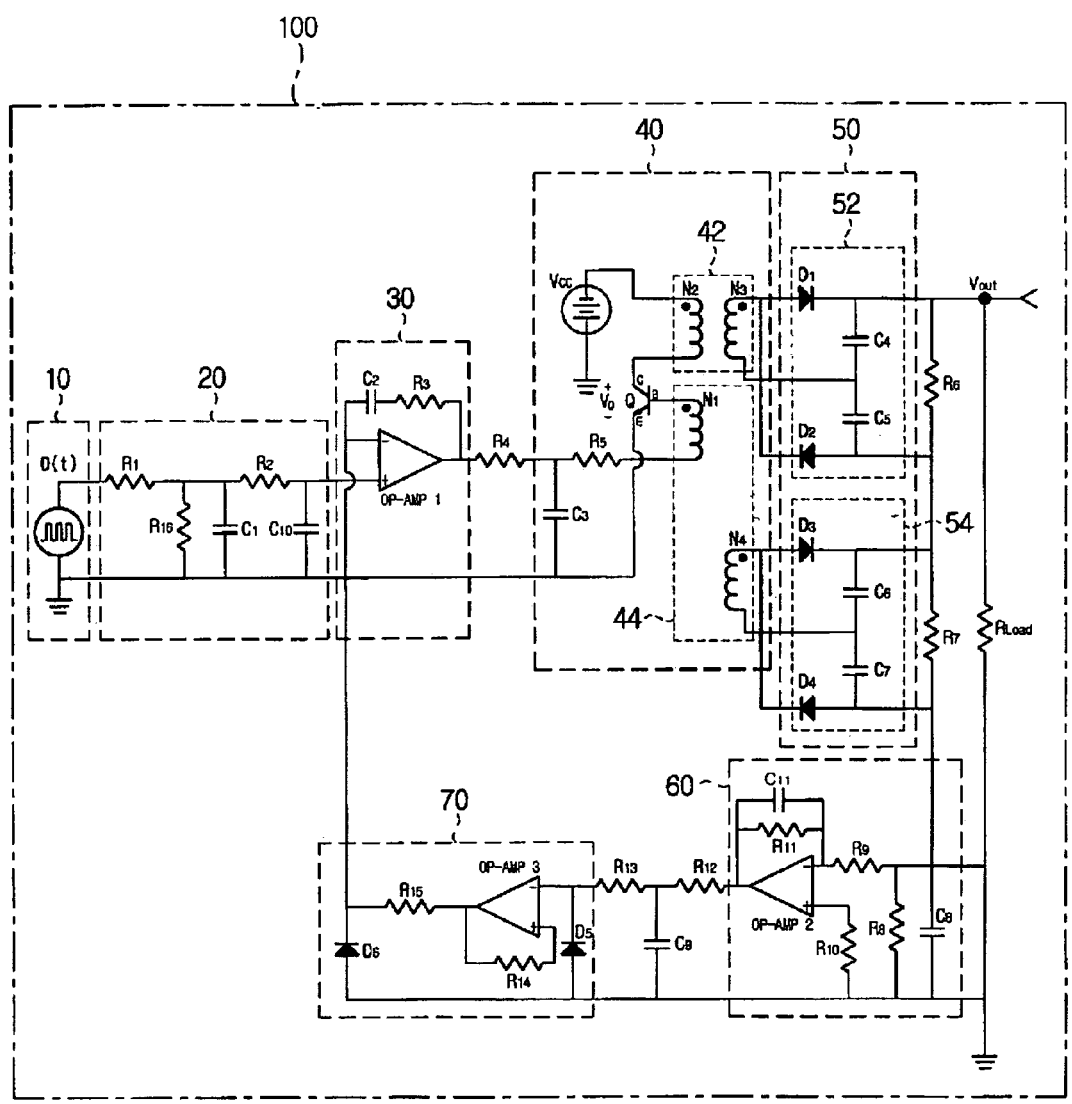
FIG. 2 is a circuit diagram of an example high voltage power supply according to an embodiment of the present invention.

Referring to FIGS. 1 and 2, a high voltage power supply 100 is shown according to an embodiment of the present invention and includes a signal input unit 10, a low pass filter 20, a controller 30, an oscillation circuit 40, a voltage multiplying circuit 50, a sensing unit 60 and a circuit protecting and rectifying unit 70.

The signal input unit 10 receives a pulse width modulation (PWM) signal corresponding to an optimum output voltage or an optimum output current, from an engine controller (not shown), and outputs the signal to the low pass filter 20.

The low pass filter 20 converts the PWM signal into a DC-level signal, and applies the same to the controller 30. When the DC-level signal is input from the low pass filter 20, it is used as a reference voltage or current signal in the controller 30. The low pass filter 20 includes a plurality of resistors R1, R2, and R16, and capacitors C1 and C10 as shown in greater detail in FIG. 2. One end of the resistor R1 is series connected with the signal input unit 10, while the other is parallel connected with the resistor R16, the resistor R2 and the capacitor C1.

The controller 30 generates and outputs a transistor drive signal and therefore, directly controls the driving of the transistor Q, and also indirectly controls the size of the output voltage at the secondary side of the transformers 42 and 44. The controller 30 includes at least one capacitor C2, resistor R3 and comparator OP-AMP 1.

The oscillation circuit 40 generates a high AC voltage by using the oscillation of the transformer 42, and outputs the generated voltage to the voltage multiplying-circuit 50. The oscillation circuit 40 includes at least one resistor R5, capacitor C3, transistor Q, plurality of transformers 42 and 44, and DC bias voltage supply Vcc. The transformers 42 and 44 may preferably be a generally-used transformer or a flyback transformer (FBT).

The voltage multiplying circuit 50 generates a multiplied output voltage from the AC voltage input from the oscillation circuit 40. The output voltage from the voltage multiplying circuit 50 is applied to a developing part through the output end Vout, and at the same time, is input to the sensing unit 60. The voltage multiplying circuit 50 includes a plurality of voltage doublers 52 and 54, each of which include a plurality of diodes D1 to D4, and capacitors C4 to C7.

The sensing unit 60 includes a plurality of resistors R8 to R11, a plurality of capacitors C8 and C11, and at least one operating amplifier OP-AMP 2. The resistor R9 is series connected with an inverse input terminal (−) of the second operating amplifier OP-AMP 2, and the resistor R10 is series connected with a non-inverse input terminal (+) of the second operating amplifier OP-AMP 2. The resistor R11 is connected between the inverse input terminal (−) and the output terminal of the second operating amplifier OP-AMP 2, and the capacitor C11 is parallel connected with the resistor R1 1. The sensing unit 60 detects, in real time, the size of the voltage or current output from the voltage multiplying circuit 50 by using the second operating amplifier OP-AMP 2.

The circuit protecting and rectifying unit 70 includes at least one operating amplifier OP-AMP 3, a plurality of resistors R14 and R15, and a plurality of diodes D5 and D6. The plurality of diodes D5 and D6 may comprise a rectifier element. The circuit protecting and rectifying unit 70 operates to protect the high voltage power supply 100, rectify the AC voltage from the sensing unit 60, and output the voltage to the controller 30 in accordance with an embodiment of the present invention.

The implementation of the above embodiment can be achieved as described below. First, when a PWM signal corresponding to an optimum output voltage or current is applied to the signal input unit 10 from the engine controller CPU (not shown), the PWM signal is converted at the low pass filter 20 into a DC voltage signal, and then applied to the non-inverse input terminal (+) of the comparator OP-AMP 1. A feedback voltage signal output from a voltage multiplying circuit 50 is received at the inverse input terminal (−) of the comparator OP-AMP 1 via the sensing unit 60 and the circuit protecting and rectifying unit 70.

The comparator OP-AMP 1 generates a transistor drive signal, which is then output to the oscillation circuit 40, when the feedback voltage signal received at the inverse input terminal (−) is smaller than the DC voltage signal output from the low pass filter 20 and applied to the non-inverse input terminal (+).

The transistor drive signal controls the size of base current of the transistor Q, and subsequently, controls the time constant and the size of the output current of the primary circuit of the transformers 42 and 44. When the transistor Q is driven according to the transistor drive signal, AC voltage is applied to the secondary side $N_3$ and $N_4$ of the first and the second transformers 42 and 44, respectively, by the oscillation phenomenon occurring between the primary windings $N_2$ and $N_1$ of the first and the second transformers 42 and 44, respectively, which are series connected with the DC bias voltage Vcc, and the capacitor C3.

If the peak of the AC voltage being generated by the secondary side $N_3$ of the first transformer 42 is Vm, the peak Vm of the AC voltage is charged in the capacitor C4 because the diode D1 is turned on during a half (+) period. In a similar manner, the diode D2 is turned on during a half (−) period, and therefore, the peak Vm of the AC voltage is charged in the capacitor C5. Accordingly, two times the peak Vm of the AC voltage being generated by the secondary side $N_3$ of the first transformer 42, i.e., the voltage of 2 Vm, is applied to the resistor R6. In other words, a first voltage doubler 52 doubles the peak Vm of the AC voltage applied from the secondary side of the first transformer 42, and outputs the result.

Additionally, there is a second voltage doubler 54 connected in series with the first voltage doubler 52. The second voltage doubler 54 doubles the peak Vm of the AC voltage generated by the secondary side $N_4$ of the second transformer 44 in the same manner as that of the first voltage doubler 52, and outputs the result.

Accordingly, the first and the second voltage doublers 52 and 54 output voltages which are approximately twice large as that of the AC voltage generated by the secondary sides of the transformers 42 and 44, and as a result, the voltages output from the voltage multiplying circuit 50 is as much as four times as large as that of the peak of the AC voltage applied at the secondary sides $N_3$ and $N_4$ of the transformers 42 and 44, respectively. Therefore, it is possible to generate high output voltage, without having to use elements of high rated voltage which are generally expensive.

The high voltage output from the voltage multiplying circuit 50 is applied to the developing unit of the image forming apparatus (not shown), where it is used for a number of tasks, such as forming a high voltage discharge at a drum. At the same time, the high voltage is provided as a feedback signal to the controller 30 via the sensing unit 60 and the circuit protecting and rectifying unit 70.

Figure 3:
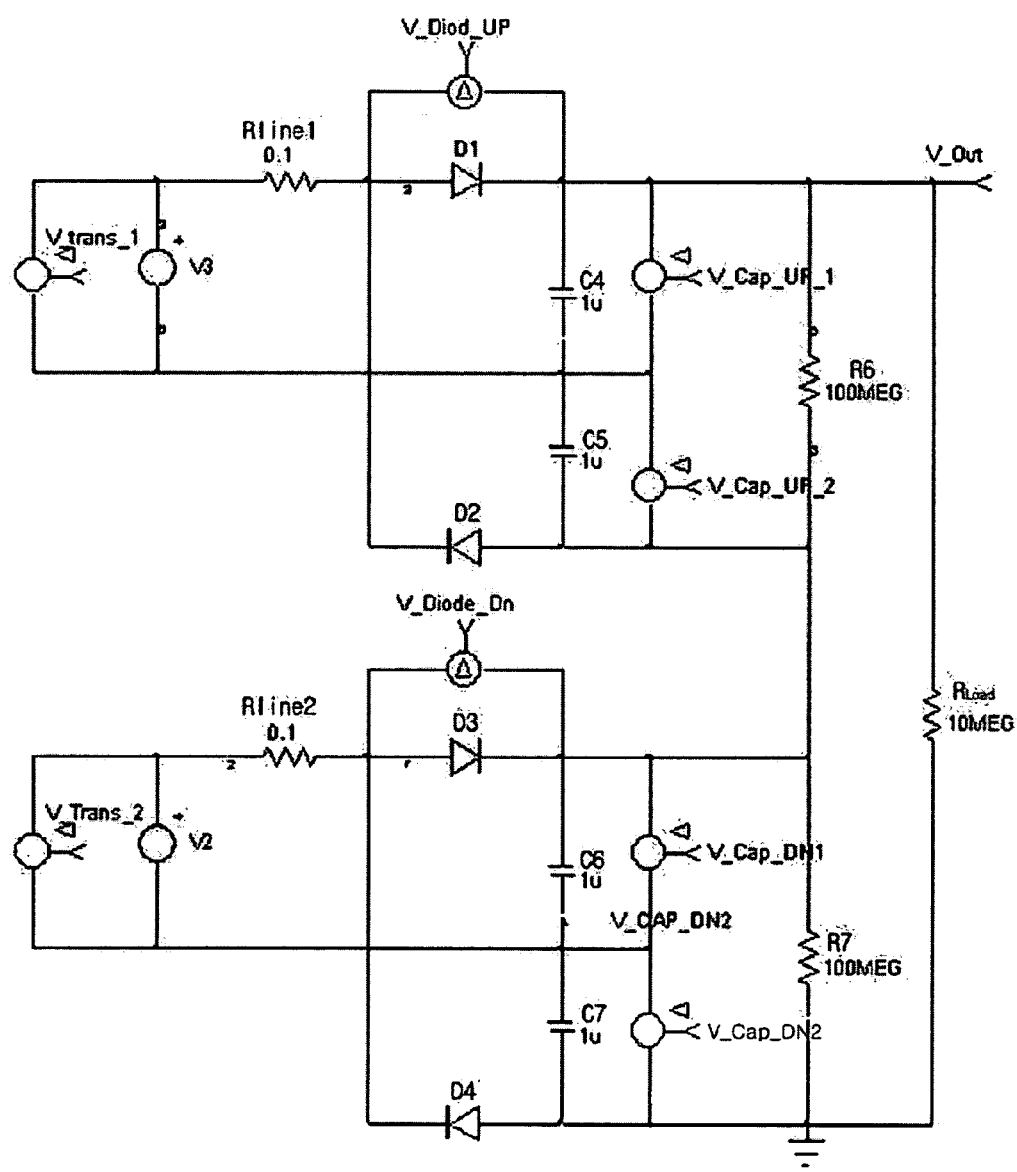
FIG. 3 is a simulation circuit diagram using a voltage transformer equivalent circuit according to an embodiment of the present invention.
Figure 4:
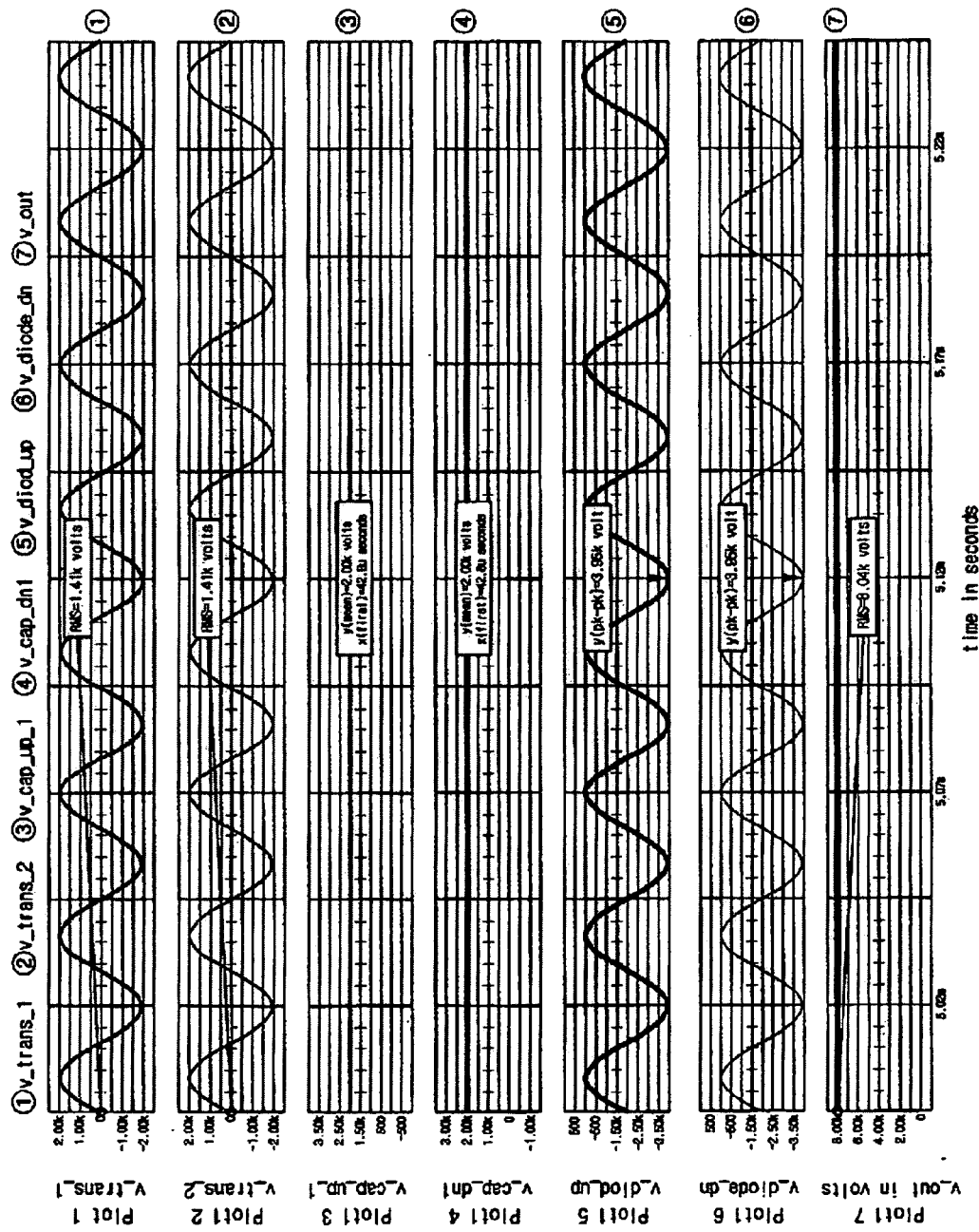
FIG. 4 is a graphical representation showing example waveforms of the voltage, and final waveforms of the voltage output from the output elements of the high voltage power supply of FIG. 3, with the voltage of 8 kV being output.

FIG. 3 is a simulation circuit diagram of the voltage multiplying circuit of FIG. 2, and FIG. 4 is a graphical representation showing the waveforms of the voltages applied to the elements at the output side, and the waveforms of the final output voltages of the high voltage power supply according to an embodiment of the present invention.

The like elements of FIG. 3 which are shown and described in FIG. 2, will be referred to by the same reference numerals.

Referring to FIGS. 3 and 4, when a voltage of approximately 8 kV is output through the output end V_Out, voltages v_cap_up1 and v_cap_up2 of approximately 2 kV each are applied to the capacitor C4 and the capacitor C5, respectively. Likewise, voltages of approximately 2 kV each are applied to the capacitors C6 and C7. In conventional devices, with the same 8 kV voltage output from the output end V_Out, voltages of approximately 4 kV each were applied to these respective capacitors. According to the embodiments of the present invention therefore, the output can be the same as that of the conventional case, that is, an output of approximately 8 kV can be obtained, without having to use capacitors of a high rated voltage.

Voltages v_diod_up and v_diod_dn, ranging from about −2 kV to about 0 kV, are applied to the diodes D1 and D3, respectively, during a half (+) period in which voltages v_trans_1 and v_trans_2 are applied to the secondary sides of the first and the second transformers 42 and 44. The reference characters $R_{line1}$ and $R_{line2}$ of FIG. 3 denote the line resistance. During a half (−) period in which the voltages v_trans_1 and v_trans_2 are applied to the secondary sides of the first and the second transformers 42 and 44, the voltages v_diod_up and v_diod_dn applied to the diodes D1 and D3 now range from approximately −4 kV to approximately 2 kV. In other words, when an 8 kV voltage is output through the output end V_Out, the size of the voltages applied to each of the diodes becomes approximately 2 kV. In conventional devices, with the same 8 kV voltage output, an approximately 4 kV voltage is applied to the respective diodes. In other words, according to the embodiments of the present invention, an output as that of the conventional case can be obtained without having to use diodes of a high rated voltage.

As described above in exemplary embodiments of the present invention, a high voltage power supply does not require capacitor or diode elements of high rated voltage at the secondary side of the transformer. As elements of high rated voltage are not required, the unit price of the high voltage power supply can be reduced, and production of economical ultra-high voltage power supplies can be anticipated.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A high voltage power supply with minimal rated circuit components, comprising:
an oscillation circuit for generating an alternating current (AC) voltage and outputting the AC voltage, wherein the oscillation circuit comprises a first and second transformer, and an oscillation of the first and second transformer generates the alternating current (AC) voltage;
a voltage multiplying circuit for increasing the AC voltage input from the oscillation circuit and outputting the increased AC voltage; and
a controller for controlling the oscillation circuit,
the voltage multiplying circuit comprises a plurality of voltage doublers for increasing the AC voltage from the oscillation circuit.

2. The high voltage power supply of claim 1, further comprising:
a low pass filter for receiving a pulse width modulation (PWM) signal, converting the received signal into a predetermined reference signal, and outputting the predetermined reference signal to the controller;
a sensing unit for detecting the size of the voltage output from the voltage multiplying circuit and generating and outputting a voltage detect signal; and
a circuit protecting and rectifying unit for rectifying the voltage detect signal input from the sensing unit into a DC level.

3. The high voltage power supply of claim 2, wherein the sensing unit detects the size of the voltage output from the voltage multiplying circuit and generates and outputs the voltage detect signal in real time.

4. The high voltage power supply of claim 1, wherein the first and second transformer comprises at least one of a general transformer and a flyback transformer.

5. The high voltage power supply of claim 2, wherein the controller further comprises:
a comparator for comparing the predetermined reference signal with the voltage detect signal, and if the voltage detect signal is smaller than the predetermined reference signal, the controller outputs a high level of voltage signal to drive the oscillation circuit.

6. The high voltage power supply of claim 5, wherein the predetermined reference signal is input to the comparator from the low pass filter.

7. The high voltage power supply of claim 5, wherein the voltage detect signal is input to the comparator from the circuit protecting and rectifying unit.

8. The high voltage power supply of claim 2, wherein the low pass filter comprises a plurality of resistors and a plurality of capacitors.

9. The high voltage power supply of claim 2, wherein the sensing unit comprises at least one operating amplifier, a plurality of resistors and a plurality of capacitors.

10. The high voltage power supply of claim 2, wherein the circuit protecting and rectifying unit comprises at least one operating amplifier, a plurality of resistors and a plurality of diodes.

11. A high voltage power supply with minimal rated circuit components, comprising:
an oscillation circuit for generating an alternating current (AC) voltage and outputting the AC voltage, wherein the oscillation circuit comprises a first and second transformer and an oscillation of the first and second transformer generate the alternating current (AC) voltage, wherein a primary winding of the first transformer is electrically coupled to a primary winding of the second transformer via a transistor;
a voltage multiplying circuit for increasing the AC voltage input from the oscillation circuit and outputting the increased AC voltage; and
a controller for controlling the oscillation circuit, the voltage multiplying circuit comprises a plurality of voltage doublers for increasing the AC voltage from the oscillation circuit.

12. The high voltage power supply of claim 11, wherein the primary winding of the first transformer comprises a first end electrically coupled to a voltage source and second end electrically coupled to a collector of the transistor, and the primary winding of the second transformer comprises a first end electrically coupled to a base of the transistor and a second end electrically coupled to the controller.

13. The high voltage power supply of claim 12, further comprising:
    a low pass filter for receiving a pulse width modulation (PWM) signal, converting the received signal into a predetermined reference signal, and outputting the predetermined reference signal to the controller;
    a sensing unit for detecting the size of the voltage output from the voltage multiplying circuit and generating and outputting a voltage detect signal; and
    a circuit protecting and rectifying unit for rectifying the voltage detect signal input from the sensing unit into a DC level.

14. The high voltage power supply of claim 13, wherein the sensing unit detects the size of the voltage output from the voltage multiplying circuit and generates and outputs the voltage detect signal in real time.

15. The high voltage power supply of claim 12, wherein the first and second transformer comprises at least one of a general transformer and a flyback transformer.

16. The high voltage power supply of claim 13, wherein the controller further comprises:
    a comparator for comparing the predetermined reference signal with the voltage detect signal, and if the voltage detect signal is smaller than the predetermined reference signal, the controller outputs a high level of voltage signal to drive the oscillation circuit.

17. The high voltage power supply of claim 13, wherein the low pass filter comprises a plurality of resistors and a plurality of capacitors.

18. The high voltage power supply of claim 13, wherein the sensing unit comprises at least one operating amplifier, a plurality of resistors and a plurality of capacitors.

19. The high voltage power supply of claim 13, wherein the circuit protecting and rectifying unit comprises at least one operating amplifier, a plurality of resistors and a plurality of diodes.

* * * * *